United States Patent [19]

Chu et al.

[11] Patent Number: 4,996,117
[45] Date of Patent: Feb. 26, 1991

[54] HIGH TEMPERATURE PROTECTIVE COATING

[75] Inventors: Wing F. Chu, Leimen; Franz J. Rohr, Absteinach, both of Fed. Rep. of Germany

[73] Assignee: BBC Aktiengesellschaft, Brown, Boveri & Cie, Baden, Switzerland

[21] Appl. No.: 412,583

[22] Filed: Sep. 25, 1989

Related U.S. Application Data

[63] Continuation of Ser. No. 183,388, Apr. 13, 1988, abandoned, which is a continuation of Ser. No. 939,565, Dec. 9, 1986, abandoned.

[30] Foreign Application Priority Data

Dec. 12, 1985 [DE] Fed. Rep. of Germany ....... 3543802

[51] Int. Cl.$^5$ .................... B32B 18/00; C04B 35/48
[52] U.S. Cl. ................... 428/633; 428/630; 428/678; 428/472; 501/105; 501/106
[58] Field of Search ............. 501/105, 106; 428/630, 428/633, 678, 472

[56] References Cited

U.S. PATENT DOCUMENTS

| 4,055,705 | 10/1977 | Stecura et al. | 428/633 |
|---|---|---|---|
| 4,248,940 | 2/1981 | Goward et al. | 428/678 X |
| 4,316,964 | 2/1982 | Lange | 501/127 X |
| 4,331,048 | 5/1982 | Dworak et al. | 501/105 X |
| 4,421,861 | 12/1983 | Claussen et al. | 501/103 OR |
| 4,429,051 | 1/1984 | Davidge et al. | 501/105 X |
| 4,525,464 | 6/1985 | Claussen et al. | 501/105 X |
| 4,538,562 | 9/1985 | Matsui et al. | 428/633 X |
| 4,552,852 | 11/1985 | Manning | 501/105 OR |
| 4,588,655 | 5/1986 | Kushner | 428/633 |
| 4,593,007 | 6/1986 | Novinski | 501/105 |
| 4,626,518 | 12/1986 | Watanabe et al. | 501/105 X |

FOREIGN PATENT DOCUMENTS

| 121966 | 9/1980 | Japan . | |
| 0077406 | 5/1985 | Japan | 501/105 |

Primary Examiner—Karl Group

[57] ABSTRACT

A high-temperature protective coating comprising a ceramic material, in particular for structural components of super-alloys, characterized in that at least one oxide of a metal of subcolumn 4 of the periodic table of elements is stabilized with at least one further oxide of a metal and is enveloped in a corrosion-resistant manner, at least in some regions, by at least one ceramic material.

4 Claims, 2 Drawing Sheets

HIGH TEMPERATURE PROTECTIVE COATING

BACKGROUND OF THE INVENTION

1. Field of the Invention

This application is a continuation of application Ser. No. 183,388 filed Apr. 13, 1988, now abandoned, which is a continuation of application Ser. No. 939,565, filed Dec. 9, 1986, now abandoned.

The invention relates to a high-temperature protective coating of a ceramic material, in particular for structural components of super-alloys, as well as to a method for producing it.

2. Description of the Prior Art

From the publication "Metall" [*Metal*] 36 (1982, part I, pp. 882 ff., and part II, pp. 1882 ff., oxidation-resistant structural components for hot-gas turbines and jet engines that have a ceramic protective coating are known. The coating is applied to the metal structural components by means of flame or plasma spraying. The metal structural components are protected from corrosive factors at high temperatures by the application of these protective coatings to them. The protection resides in the reduction of undesirable chemical attacks on the component and/or in the lowering of the temperature in the region of the surface of the structural component as compared with the temperature on the surface of the protective coating.

In this flame or plasma spraying process, partly melted or largely liquified ceramic particles are sprayed onto the surface of the component that is to be protected. Attempts to produce such high-temperature protective coatings of zirconium oxide previously were unsuccessful because of the fact that this ceramic material has to be stabilized. Yttrium oxide or magnesium oxide is used for this purpose. These materials, however, have the property of reacting with vanadium pentoxide, which is contained in hot gases to which gas turbines are exposed. The result is a destabilization of the cubic phase of the zirconium oxide. The ceramic material applied by means of plasma spraying, and in particular the protective coating formed in this way, is loosened from the component as a result, and the component is exposed to the direct corrosive action of the hot gases.

SUMMARY OF THE INVENTION

It is accordingly an object of the invention to provide a method for producing a high-temperature protective coating as well as such a high-temperature protective coating of ceramic material which is particularly resistant to corrosive ingredients in hot gases, and which furthermore adheres particularly well and durably to the surface of metal structural components.

With the foregoing and other objects in view, there is provided in accordance with the invention a high-temperature protective coating, in particular for structural components of super-alloys, comprising, a ceramic material composed of at least one oxide of a metal of subcolumn 4 of the periodic table of elements stabilized with at least one further oxide of a metal and which stabilized metal oxide is enveloped in a corrosion-resistant manner, at least in some regions, by at least one ceramic material.

In accordance with the invention there is provided a method for producing a high-temperature protective coating, in particular for structural components of super-alloys, composed of at least one oxide of a metal of subcolumn 4 of the periodic table of elements stabilized with at least one further oxide of a metal, and a corrosion-resistant ceramic material enveloping in a corrosion-resistant manner the stabilized metal oxide, which comprises, mixing at least one oxide of a metal of subcolumn 4 of the periodic table of elements with a stabilizing metal oxide and a corrosion-resistant ceramic material, grinding the mixture and then sintering the ground mixture to form a corrosion-resistant envelope around the stabilized oxide of a metal of subcolumn 4 of the periodic table.

There is provided in accordance with the invention a method of protecting a structural element of a super-alloy, particularly components for hot-gas turbines and jet engines, from corrosive factors at high temperatures, which comprises applying on the substrata of the structural element a high-temperature protective coating composed of at least one oxide of a metal of subcolumn 4 of the periodic table of elements stabilized with at least one further oxide of a metal and which stabilized metal oxide is enveloped in a corrosion-resistant manner, at least in some regions, by at least one ceramic material, and applying on the substrata prior to the application of the high-temperature protective coating, an intermediate adhesive layer of $M_1CrAlM_2$, wherein $M_1$ stands for nickel, cobalt or a nickel/cobalt combination and $M_2$ stands for yttrium or an yttrium/silicon combination.

Other features which are considered as characteristic for the invention are set forth in the appended claims.

Although the invention is illustrated and described herein as embodied in high-temperature protective coating, and method for its production, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with, the accompanying drawings, in which.

DESCRIPTION OF THE PREFERRED EMBODIMENTS

The high-temperature protective coating has the required mechanical strength. It also has the necessary resistance to thermal shock and the required resistance to corrosion. The stabilization of the zirconium oxide is effected by means of a metal oxide, in particular yttrium oxide or magnesium oxide. By the addition of a ceramic material in the form of silicon dioxide, aluminum oxide, an aluminum silicate, a zirconium silicate or an aluminum titanate, or a mixture thereof, a durable protective coating is formed around the zirconium oxide stabilized with yttrium oxide or magnesium oxide, a coating that cannot be removed by the corrosive effects and in particular by chemical reactions with ingredients in the hot gases.

For producing the high-temperature protective coating, zirconium oxide is mixed with a stabilizing ceramic material in the form of a metal oxide, preferably yttrium oxide or magnesium oxide, as well as a second ceramic material that forms a protective coating. The mixture is then ground, and then sintered at a temperature of 1500° C. The thereby formed particles of powder contain a zirconium oxide and yttrium oxide combination or a zirconium oxide and magnesium oxide combination in their core, with at least in some regions, a protective envelope containing silicon dioxide, aluminum oxide, an aluminum silicate, a zirconium silicate, an aluminum titanate or a mixture of these materials. The powder formed in this manner is applied by means of plasma spraying or flame spraying to the substrate of metal components. An intermediate adhesive layer comprising $M_1CrAlM_2$ is preferably first applied to the substrate of these structural components; wherein $M_1$ stands for nickel, cobalt, or nickel/cobalt and $M_2$ stands for yttrium, yttrium/silicon or a material having similar properties.

The invention will be described in greater detail below, referring to drawings.

Figure 1:
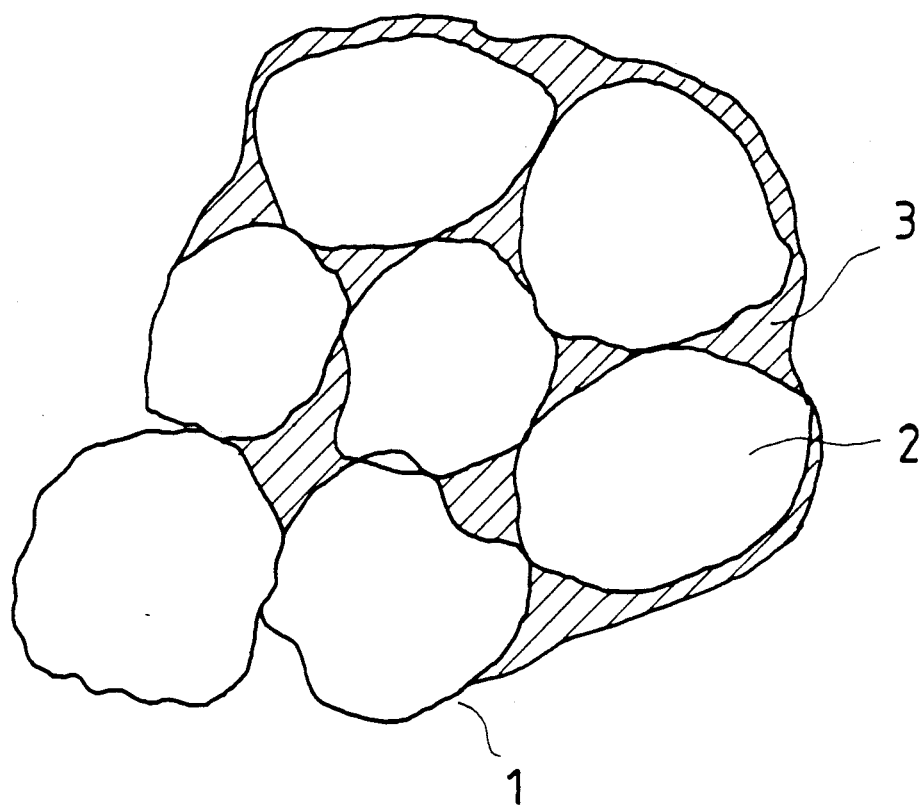
FIG. 1 illustrates a particle of the powder forming the high-temperature protective coating and produced by the method according to the invention.

FIG. 1 shows a particle of the powder that is used for producing the high-temperature protective coating. To produce such particles, zirconium oxide in particular is mixed with a stabilizing ceramic material and a corrosion-resistant ceramic material. The oxides of the rare earth metals are examples of stabilizing ceramic material. Yttrium oxide, dysprosium oxide and gadolinium oxide are the preferred oxides for this purpose. The oxides of the alkali earth metals may also be used as stabilizing ceramic materials. If an alkali earth metal is used, magnesium oxide is preferable. In the exemplary embodiment shown here, the subparticles 2 forming the core of the particle 1 comprise zirconium oxide that is stabilized with yttrium oxide. These subparticles 2 are surrounded by an anti-corrosion layer 3, which is formed from zirconium silicate, silicon dioxide, aluminum oxide, aluminum silicate, an aluminum titanate or a mixture of these compounds. To produce the particles 1 forming the powder of the high-temperature protective coating, zirconium oxide is mixed with the above-described stabilizing metal oxide having ceramic properties and with the corrosion-resistant material also described above, the mixture ground and sintered at a temperature of approximately 1500° C. The powdered material so formed has particles that have the structure shown in FIG. 1. The molar percentages with which the zirconium oxide should be mixed with the stabilizing material and with the corrosion-resistant ceramic material may be found in the following table. In the table, A stands for the rare earth metals, in particular yttrium, dysprosium, and gadolinium. B stands for the alkali earth metals, in particular magnesium.

| Basic Material in % by mole | Stabilizer Oxide in % by mole | Anti-Corrosion Additive in % by mole |
| --- | --- | --- |
| 93–62 $ZrO_2$ | 2–8 $A_2O_3$ | 5–30 $SiO_2$ |
| 92–55 $ZrO_2$ | 3–15 BO | 5–30 $SiO_2$ |
| 93–52 $ZrO_2$ | 2–8 $A_2O_3$ | 5–50 $ZrSiO_4$ |
| 92–40 $ZrO_2$ | 3–10 BO | 5–50 $ZrSiO_4$ |
| 97–82 $ZrO_2$ | 2–8 $A_2O_3$ | 1–10 $Al_2O_3$ |
| 96–75 $ZrO_2$ | 3–15 BO | 1–10 $Al_2O_3$ |
| 93–62 $ZrO_2$ | 2–8 $A_2O_3$ | 2/3–12/18 $SiO_2/Al_2O_3$ |
| 92–55 $ZrO_2$ | 3–15 BO | 2/3–12/18 $SiO_2/Al_2O_3$ |
| 93–62 $ZrO_2$ | 2–8 $A_2O_3$ | 3/2–18/12 $Al_2O_3/TiO_2$ |
| 92–55 $ZrO_2$ | 3–15 BO | 3/2–18/12 $Al_2O_3/TiO_2$ |

During the sintering process, $ZrO_2$ ($Y_2O_3$) or $ZrO_2$ (MgO) stabilized by solid-state reactions and unstabilized monoclinic or tetragonal zirconium oxide as well as zirconium silicate from zirconium oxide and silicon dioxide or quartz and/or alpha-aluminum oxide and/or aluminum silicate from silicon dioxide and aluminum oxide are formed. The resultant reaction products zirconium silicate, silicon dioxide, alpha-aluminum oxide and aluminum silicate react only little or not at all with the zirconium oxide stabilized by yttrium oxide or magnesium oxide, or the unstabilized zirconium oxide. Instead, it is extracted in an independent phase, preferentially on the grain boundaries of the stabilized zirconium oxide crystals, in particular the crystals of the zirconium oxide and yttrium oxide combinations. By means of the sintering an extensive enveloping of the stabilized zirconium oxide crystals with these reaction products is attained, as shown in FIG. 1. The enveloping reaction substances are resistant to hot-gas corrosion such as that caused by vanadium pentoxide and alkali sulfate. By means of the enveloping reaction products, the stabilized zirconium oxide, which is not resistant to corrosion, is protected from attack by vanadium pentoxide and alkali sulfate, and the long-term durability of this ceramic high-temperature protective coating, in particular in corrosive hot gases, is improved thereby. Although when dysprosium or gadolinium oxide is used as the stabilizing ceramic material there is the risk that these materials will react with vanadium pentoxide and alkali sulfate, nevertheless they are thermodynamically more stable than yttrium oxide and magnesium oxide, so that along with an enveloping of the stabilized zirconium oxide crystals as described above, a further improvement in the corrosion resistance of the high-temperature protective coating is attained.

Figure 2:
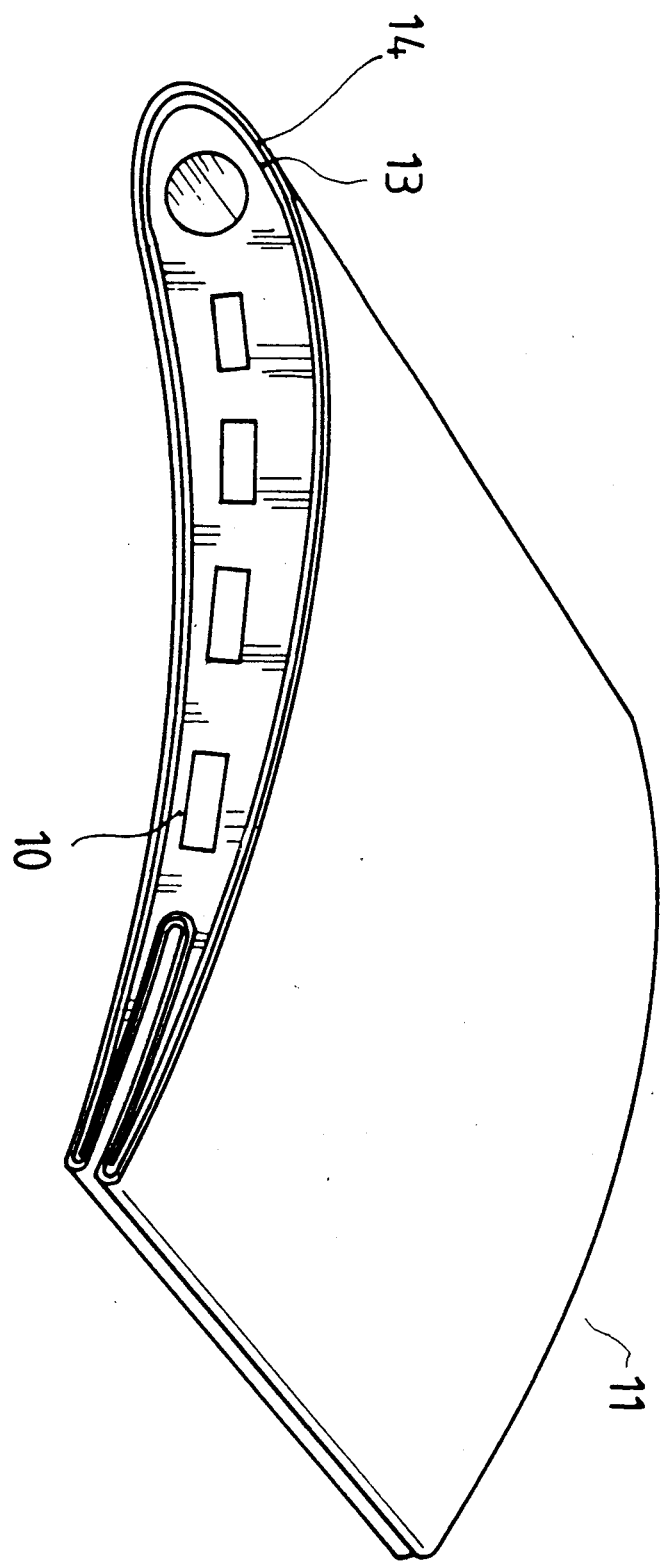
FIG. 2 shows a structural component of a gas turbine.

FIG. 2 shows the structural component 11 of a gas turbine. This component 11 is exposed continuously to hot gases, which contain vanadium pentoxide and alkali sulfate, among other ingredients. To protect against corrosive effects, the component 11 is coated with the high-temperature protective coating 14 according to the invention. The substrate 10 of the component 11 comprises an austenitic material. To the cleaned surface of the substrate 10, first an intermediate adhesive layer 13 is applied, comprising an alloy having the composition $M_1CrAlM_2$, where $M_1$ stands for nickel, cobalt or a nickel/cobalt combination, and $M_2$ stands for yttrium or an yttrium/silicon combination. This alloy is applied to the substrate 10 by means of plasma spraying. Subsequent to that the powdered ceramic material, which forms the high-temperature protective coating, is applied to the substrate 10 of the component 11, once again with the aid of a plasma spraying method. The powder used has a particle diameter of approximately 25 to 63 /μm. The ceramic high-temperature protective coating 14 applied by plasma spraying preferably has a thickness of from 100 to 400 /μm.

The foregoing is a description corresponding, in substance, to German application No. P 35 43 802.9, dated Dec. 12, 1985, International priority of which is being claimed for the instant application, and which is hereby made part of this application. Any material discrepancies between the foregoing specification and the specification of the aforementioned corresponding German application are to be resolved in favor of the latter.

There is claimed:

1. A structural component consisting essentially of a super alloy having a high temperature protective coating, said coating, essentially consists of a ceramic material of 93–42 mole % of the oxide of zirconium, mixed with 2-8 mole % of yttrium oxide, for forming a stabilized zirconium oxide crystal combination, said combination, additionally being mixed with 5-50 mole % of zirconium silicate, said mixture being ground and sintered at a temperature between 1450° C. and 1500° C. to form a corrosion-resistant envelope around the stabilized zirconium oxide crystals and coated onto said super alloy substrate.

2. A structural component consisting essentially of a super alloy having a high temperature protective coating, essentially consisting of 92-40 mole % of the oxide of zirconium, mixed with 3-10 mole % of magnesium oxide for forming a stabilized zirconium oxide crystal combination, said combination additionally being mixed with 5-50 mole % of zirconium silicate, said mixture being ground and sintered at a temperature between 1450° C. and 1500° C. to form a corrosion-resistant envelope around the stabilized zirconium oxide crystals and coated onto said super alloy substrate.

3. A structural component consisting essentially of a super alloy having a high temperature protective coating, essentially consisting of 93-62 mole % of the oxide of zirconium, mixed with 2-8 mole % of yttrium oxide for forming a stabilized zirconium oxide and yttrium oxide combination, said combination being additionally mixed with an amount of an aluminum titanate, wherein the amount of $Al_2O_3$ is between 3 and 18 mole % and the amount of $TiO_2$ is between 2 and 12 mole %, and being sufficient to impart corrosion-resistance to said combination, said mixture being ground and sintered at a temperature between 1450° C. and 1500° C. to form a corrosion-resistant aluminum titanate envelope around the stabilized zirconium oxide combination and coated onto said super alloy substrate.

4. A structural component consisting essentially of a super alloy having a high temperature protective coating, essentially consisting of a ceramic material of 92-55 mole % zirconium oxide, mixed with 3-15 mole % of magnesium oxide, for forming a stabilized zirconium oxide and magnesium oxide combination, said combination being additionally mixed with an amount of corrosion-resistant aluminum titanate, wherein the amount of $Al_2O_3$ is between 3 and 18 mole % and the amount of $TiO_2$ is between 2 and 12 mole %, and being sufficient to impart corrosion resistance to said combination said mixture being ground and sintered at a temperature between 1450° C. and 1500° C. to form a corrosion-resistant envelope substantially surrounding said stabilized zirconium oxide combination and coated onto said super alloy substrate.

* * * * *